United States Patent [19]
Urano et al.

[11] Patent Number: 5,922,101
[45] Date of Patent: Jul. 13, 1999

[54] METHOD OF PREPARING COMPOSITION FOR SPRAYING ON PLANT LEAVES OR FRUITS

[75] Inventors: Teruo Urano, Sano; Hiroshi Miyaji, Utsunomiya, both of Japan

[73] Assignee: Murakashi Lime Industry Co., Ltd, Tochigi Prefecture, Japan

[21] Appl. No.: 08/954,614

[22] Filed: Oct. 20, 1997

[30] Foreign Application Priority Data

Oct. 21, 1996 [JP] Japan ................................ 8-277852

[51] Int. Cl.$^6$ ................................................. C05F 11/00
[52] U.S. Cl. ................................................. 71/27; 71/64.1
[58] Field of Search .......................................... 71/64.1, 27

[56] References Cited

U.S. PATENT DOCUMENTS

| | | | |
|---|---|---|---|
| 435,735 | 9/1982 | Buddemeyer et al. | 71/27 |
| 4,125,393 | 11/1978 | Kohl et al. | 71/27 |
| 5,158,595 | 10/1992 | Stillman | 71/64.1 |
| 5,352,264 | 10/1994 | Medina Vega | 71/64.1 |
| 5,704,961 | 1/1998 | Hudson | 71/64.1 |

FOREIGN PATENT DOCUMENTS

| | | | |
|---|---|---|---|
| A-59-137384 | 8/1984 | Japan | C05D 3/00 |
| A-60-260487 | 12/1985 | Japan | C05D 7/00 |
| 63-248789 | 10/1988 | Japan | 71/27 |
| A-4-8231 | 1/1992 | Japan | A01G 7/06 |
| A-4-202080 | 7/1992 | Japan | C05G 5/00 |

*Primary Examiner*—Wayne Langel
*Attorney, Agent, or Firm*—Pillsbury Madison & Sutro LLP

[57] ABSTRACT

In order to prevent biological lesions of plants caused by deficiency in calcium, the present invention is directed to provide a method of preparing at low cost a composition containing saccharides, organic acids and high content calcium component for spraying on plant leaves or fruits. Into an aqueous solution containing glucose and an organic acid, calcium hydroxide or a substance capable of forming calcium hydroxide upon hydration in an aqueous solution is dissolved. The organic acid is at least one selected from formic acid, acetic acid and propionic acid. The adding order of glucose and organic acid to water is not restricted, and the concurrent addition is allowed. The calcium hydroxide is added finally. The amount of glucose is from 15 wt. % to 40 wt. % of water and that of the organic acid is from 3 wt. % to less than 20 wt. % of water.

3 Claims, No Drawings

METHOD OF PREPARING COMPOSITION FOR SPRAYING ON PLANT LEAVES OR FRUITS

BACKGROUND OF THE INVENTION

1. Field of the Invention

The present invention relates to a method of preparing a composition to be sprayed on plant leaves or fruits for the purpose of preventing biological lesions caused by deficiency of calcium component, and specifically relates to a method capable of preparing a composition having an enhanced content of water-soluble calcium component.

2. Description of the Prior Art

Calcium component is quite important for plant growth causing translocation of nutrients and improvement in cell assimilation. Further, calcium component is effective in neutralizing organic acids formed in plant bodies, and deficiency thereof brings about acidification of the humor to result in a hindered synthesis or translocation of hydrocarbons. Calcium component is generally recognized as difficultly movable in plant bodies, being contained more in old leaves than in young leaves, and movable scarcely into fruiting bodies.

Biological lesions caused by the deficiency in calcium component include Bitter Pit of apple and Blossom-end rot incidence of tomato and Core rot incidence of celery or Chinese cabbage, for example. Calcium component existing in soil are not necessarily absorbed and utilized fully by plants, as will be apparent from the fact that biological lesion is caused by deficiency in calcium despite the soil was supplied beforehand with calcareous fertilizers.

In order to supplement the deficiency in calcium and to cope directly and aggressively with the biological lesion caused by deficiency in calcium, there is a method of rendering the calcium to be absorbed by spraying a water-soluble calcium component directly on plant leaves or fruits. The water-soluble calcium component employed generally is calcium chloride or calcium primary phosphate, however, these compounds are not satisfactory to plants for supplying them with calcium component, as the former sometimes causes phytotoxicity and the latter has problems of the inferior solubility and a lowered pH.

For solving the problem of inferior solubility, various calcium compounds of highly soluble in water have been proposed for compositions to be sprayed on plant leaves or fruits. There are proposed methods using, for example, calcium formate in JP-A-59-137384, calcium acetate in JP-A-60-260487 and calcium propionate in JP-A-4-202080. However, as these calcium compounds are rather expensive, it is desirous of having a method of preparing an inexpensive composition for spraying on plants, in which the composition has a calcium solubility equivalent to or larger than that of these calcium compounds and causes no phytotoxicity.

JP-A-4-8231 discloses a composition containing a water-soluble calcium component, a saccharide and an organic acid for spraying on plant leaves or fruits. The reference teaches that the organic acid is absorbed to lower the pH and acidifies the plant, the calcium component is absorbed and adjusts or neutralizes the lowered pH of the plant and the saccharide stimulates absorption of the calcium component by its effect on the osmotic pressure. As to preparation methods of the composition, mention is made in the Example as for adding an aqueous solution of an organic acid (propionic acid, citric acid) to an aqueous solution of monocalcium saccharose or adding a saccharide (glucose) to an aqueous solution of an organic acid (propionic acid, citric acid) calcium salt. However, the disclosed concentration of calcium component is 4.0% as CaO, and no mention is made on the intention or the method for enhancing the concentration of calcium component.

The present inventors gave attention to an increased solubility of calcium component in an aqueous solution of glucose, due to formation of a water soluble calcium complex when $Ca(OH)_2$ was added to the glucose solution. A further study on the increased solubility made them find out that it was possible to increase the solubility of calcium component and stability of the solution by means of preparing firstly an aqueous solution containing glucose and an organic acid, and then adding to the solution calcium hydroxide or a substance capable of forming calcium hydroxide upon hydration.

SUMMARY OF THE INVENTION

In view of the above, the present invention is directed to provide a method of preparing at a low cost a composition containing saccharides, organic acids and a high concentration calcium component usable for spraying on plant leaves or fruits.

The method of preparing a composition containing water-soluble calcium component, saccharides and organic acids for spraying on plant leaves or fruits according to the present invention is characterized by that the method comprising steps of providing an aqueous solution containing glucose and an organic acid, and dissolving calcium hydroxide or a substance capable of forming calcium hydroxide upon hydration into said aqueous solution.

DESCRIPTION OF THE PREFERRED EMBODIMENTS

The adding order of glucose and the organic acid to the water is not restricted, for which either can be the first and the concurrent addition is allowable. The calcium hydroxide is added at last. For preparing a composition containing a highly concentrated water-soluble calcium component, the amount of glucose is from 15 wt. % to 40 wt. %, preferably from 20 wt. % to 35 wt. %, of water. The amount of organic acid is from 3 wt. % to less than 20 wt. %, preferably from 5 wt. % to 15 wt. %, of water. Too large amount of the organic acid causes gelation of the solution prior to dissolution of a sufficient amount of calcium hydroxide is completed.

As to the raw material for $Ca(OH)_2$ (calcium hydroxide), in addition to the most economically available slaked lime, quick lime being capable of forming calcium hydroxide upon hydration is also usable.

It is reasoned that $Ca(OH)_2$ dissolved in an aqueous solution of glucose exists not only in a form of dissociated $Ca^{2+}$ but also in a dissolved state of a complex formed with $Ca(OH)_2$ and glucose, and that the complex has an intense solubility in the solution. The reason why the solubility of calcium component increases in an aqueous solution containing both glucose and the organic acid is not sure, however, it is guessed that a possible coexistence of the dissolved calcium component of the calcium complex formed with glucose and the dissociated $Ca^{2+}$ in the solution contributes to increase the solubility of the calcium component. Thus, according to the method of present invention, the resulting solution has not only an increased dissolution of calcium component but also has an improved storage stability being affected little by the temperature and gaseous carbon dioxide.

When Ca(OH)$_2$ is dissolved in an aqueous solution of glucose, the saturated solution obtained shows a strong alkaline pH of about 13. However, when Ca(OH)$_2$ is dissolved in an aqueous solution of glucose containing an organic acid, not only an increased solubility of Ca(OH)$_2$ but also a lowered pH are attainable (for a solution dissolving more Ca(OH)$_2$ than the above, pH of about 12 is attainable).

In the preparation of the composition for spraying on plant leaves or fruits according to the present method, when disaccharides such as saccharose (cane sugar) and maltose, polysaccharides such as maltotriose and maltotetraose are hydrolyzed by use of an organic acid and converted partly or wholly into monosaccharides as glucose and fructose, the composition employing the resulted monosaccharides in place of glucose can exhibit the same effect as that exhibited by use of glucose.

For the present invention, the organic acid is not only useful for adjusting pH of the composition for spraying on plant leaves or fruits but also is effective in increasing absorption of the calcium component by plants. As for the organic acid, at least one selected from formic acid, acetic acid and propionic acid is preferred.

The present invention will be explained in detail hereunder by reference to the Examples.

[EXAMPLE 1]

Into an aqueous solution of 20° C. containing 25 wt. % (per total) of glucose (guaranteed reagent) and 5 wt. % (per total) of formic acid (guaranteed reagent) was dissolved slaked lime (JIS [Japanese Industrial Standard] guaranteed) to prepare a solution composition saturated with the slaked lime. The amount of slaked lime for saturating 100 g of the glucose-formic acid aqueous solution was 13.70 g, and the amount of water-soluble calcium component in the saturated solution composition was 9.12 wt. % (as CaO). pH of the composition was 11.10. No precipitation was formed from the solution during its storage at room temperature for 6 months.

[EXAMPLE 2]

Into an aqueous solution of 20° C. containing 25 wt. % (per total) of glucose (guaranteed reagent) and 5 wt. % (per total) of acetic acid (guaranteed reagent) was dissolved slaked lime (JIS guaranteed) to prepare a solution composition saturated with the slaked lime. The amount of slaked lime for saturating 100 g of the glucose.acetic acid aqueous solution was 14.25 g, and the amount of water-soluble calcium component in the saturated solution composition was 9.44 wt. % (as CaO). pH of the composition was 12.45. No precipitation was formed in the composition during its storage at room temperature for 6 months.

[EXAMPLE 3]

Into an aqueous solution of 20° C. containing 25 wt. % (per total) of glucose (guaranteed reagent) and 5 wt. % (per total) of propionic acid (guaranteed reagent) was dissolved slaked lime (JIS guaranteed) to prepare a solution composition saturated with the slaked lime. The amount of slaked lime for saturating 100 g of the glucose.propionic acid aqueous solution was 13.53 g, and the amount of water-soluble calcium component in the saturated solution composition was 9.02 wt. % (as CaO). pH of the composition was 11.40. No precipitation was formed in the composition during its storage at room temperature for 6 months.

[COMPARATIVE EXAMPLE 1]

Into an aqueous solution of 20° C. containing 25 wt. % (per total) of glucose (guaranteed reagent) was dissolved slaked lime (JIS guaranteed) to prepare a solution composition saturated with the slaked lime. The amount of slaked lime for saturating 100 g of the aqueous glucose solution was 10.18 g, and the amount of water-soluble calcium component in the saturated solution composition was 6.98 wt. % (as CaO). pH of the composition was 13.81. A slight precipitation was formed in the composition after its storage at room temperature for one month.

[COMPARATIVE EXAMPLE 2]

Into a clean water of 20° C. was dissolved slaked lime (JIS guaranteed) to prepare a solution composition saturated with the slaked lime. The amount of slaked lime for saturating 100 g of the water was 0.165 g, and the amount of water-soluble calcium component in the saturated solution composition was 0.125 wt. % (as CaO). pH of the composition was 13.2.

[COMPARATIVE EXAMPLE 3]

Into an aqueous solution of 20° C. containing 25 wt. % (per total) of glucose (guaranteed reagent) was dissolved calcium formate (guaranteed reagent) to prepare a solution composition saturated with the calcium formate. The amount of water-soluble calcium component in the saturated solution was 4.44 wt. %. (as CaO). pH of the composition was 6.74.

[COMPARATIVE EXAMPLE 4]

Into a clean water of 20° C. was dissolved calcium formate (guaranteed reagent) to prepare a solution composition saturated with the calcium formate. The amount of water-soluble calcium component in the saturated solution was 7.15 wt. %. (as CaO). pH of the composition was 7.02.

[COMPARATIVE EXAMPLE 5]

Into a clean water of 20° C. was dissolved calcium acetate monohydrate (guaranteed reagent) to prepare a solution composition saturated with the calcium acetate. The amount of water-soluble calcium component in the saturated solution was 7.48 wt. % (as CaO). pH of the composition was 7.32.

[COMPARATIVE EXAMPLE 6]

Into a clean water of 20° C. was dissolved calcium propionate (guaranteed reagent) to prepare a solution composition saturated with the calcium propionate. The amount of water-soluble calcium component in the saturated solution was 8.58 wt. % (as CaO). pH of the composition was 7.36.

The results obtained in Examples 1–3 and Comparative Examples 1–6 are summarized in Table 1. The amount of water-soluble calcium component (as CaO) for saturating the aqueous solutions containing glucose and the organic acid with calcium hydroxide (Example 1–3) is larger respectively than the amount of water-soluble calcium component (as CaO) for saturating an aqueous solution containing glucose only with calcium hydroxide (Comparative Example 1); for saturating a clean water with calcium hydroxide (Comparative Example 2); for saturating an aqueous solution containing glucose and the calcium salt of organic acid with the calcium salt of organic acid (Comparative Example 3); and for saturating an aqueous solution of the calcium salt of organic acid with the calcium salt of organic acid (Comparative Examples 4–6). The influence of kinds of organic acid is not so remarkable.

TABLE 1

| | Aqueous solution of glucose · acid | | Ca(OH)$_2$ dissolved (g/100 g) | CaO in composition (wt. %) | pH |
|---|---|---|---|---|---|
| | Glucose concentration (wt. %) | Acid concentration (wt. %) | | | |
| Example. 1 | 25 | 5 | 13.70 | 9.12 | 11.10 |
| Example. 2 | 25 | 5 | 14.25 | 9.44 | 12.45 |
| Example. 3 | 25 | 5 | 13.53 | 9.02 | 11.40 |
| Comp. Ex. 1 | 25 | 0 | 10.18 | 6.98 | 13.81 |
| Comp. Ex. 2 | 0 | 0 | 0.165 | 0.125 | 13.2 |
| Comp. Ex. 3 | 25 | 0 | | 4.44 | 6.74 |
| Comp. Ex. 4 | 0 | 0 | | 7.15 | 7.02 |
| Comp. Ex. 5 | 0 | 0 | | 7.48 | 7.32 |
| Comp. Ex. 6 | 0 | 0 | | 8.58 | 7.36 |

[EXAMPLE 4]

Into an aqueous solution containing glucose and acetic acid having concentrations shown in Table 2 was dissolved at 20° C. slaked lime to obtain the saturated solution. The amount of slaked lime for saturating 100 g of the aqueous solution and the resulted pH are shown in Table 2.

TABLE 2

| Aqueous solution of glucose · acid | | Ca(OH)$_2$ dissolved (g/100 g) | pH |
|---|---|---|---|
| Glucose concentration (wt. %) | Acid concentration (wt. %) | | |
| 20 | 0 | 8.20 | 13.75 |
| 20 | 5 | 11.32 | 12.21 |
| 20 | 10 | 14.65 | 12.04 |
| 20 | 15 | 17.39 | 11.90 |
| 20 | 20 | gelation | — |
| 25 | 0 | 10.18 | 13.81 |
| 25 | 5 | 14.25 | 12.45 |
| 25 | 10 | 18.16 | 12.24 |
| 25 | 15 | 20.58 | 12.07 |
| 25 | 20 | gelation | — |
| 30 | 0 | 12.12 | 13.78 |
| 30 | 5 | 14.69 | 12.28 |
| 30 | 10 | 19.40 | 12.12 |
| 30 | 15 | 21.40 | 12.00 |
| 30 | 20 | gelation | — |
| 35 | 0 | 14.15 | 13.80 |
| 35 | 5 | 15.87 | 12.19 |
| 35 | 10 | 20.80 | 11.99 |
| 35 | 15 | gelation | — |

The relation between the concentration of glucose, concentration of acetic acid and the saturation solubility of slaked lime is summarized in Table 3.

TABLE 3

| | | Glucose concentration (g/100 g) | | | |
|---|---|---|---|---|---|
| | | 20 | 25 | 30 | 35 |
| Acetic acid concentration (g/100 g) | 0 | 8.20 | 10.18 | 12.12 | 14.15 |
| | 5 | 11.32 | 14.25 | 14.69 | 15.87 |
| | 10 | 14.65 | 18.16 | 19.40 | 20.80 |
| | 15 | 17.39 | 20.58 | 21.40 | gelation |
| | 20 | gelation | gelation | gelation | gelation |

It is understood from Table 3 that the amount of glucose in the aqueous solution is from 15 wt. % to 40 wt. %, preferably from 20 wt. % to 35 wt. %, and the amount of the organic acid in the aqueous solution is from 3 wt. % to less than 20 wt. %, preferably from 5 wt. % to 15 wt. %.

[EXAMPLE 5]

An aqueous solution containing 17 wt. % (per total) of maltose (guaranteed reagent) and 11.5 wt. % (per total) of acetic acid (guaranteed reagent) was provided. Maltose was hydrolyzed in the solution and an aqueous solution containing glucose and acetic acid was obtained. To the resulted solution was added slaked lime (JIS guaranteed) to prepare a saturated solution composition. The amount of water-soluble calcium component in the composition was 9.08 wt. % (as CaO). pH of the composition was 11.44.

[COMPARATIVE EXAMPLE 7]

Into an aqueous solution of 20° C. containing 100 parts by weight of water and 25 parts by weight of maltose (guaranteed reagent) was dissolved slaked lime (JIS guaranteed) to prepare a solution composition saturated with calcium hydroxide. The concentration of water-soluble calcium component in the composition was 3.19% (as CaO). pH of the composition was 12.38.

By virtue of the present invention, it is possible to prepare economically a high calcium content composition for spraying on plant leaves or fruits.

What is claimed is:

1. A method of preparing a composition containing water-soluble calcium component, saccharides and organic acids for spraying on plant leaves or fruits, wherein said method comprises the steps of providing an aqueous solution containing glucose and an organic acid, and dissolving calcium hydroxide or a substance capable of forming calcium hydroxide upon hydration into said aqueous solution.

2. The method of preparing a composition to be sprayed on plant leaves or fruits according to claim 1, in which said organic acid is at least one selected from the group consisting of formic acid, acetic acid and propionic acid.

3. The method of preparing a composition to be sprayed on plant leaves or fruits according to claim 1, in which said aqueous solution contains from 15 wt. % to 40 wt. % of glucose and from 3 wt. % to less than 20 wt. % of the organic acid, respectively, relative to the water.

* * * * *